United States Patent
Reiker

(10) Patent No.: US 6,207,897 B1
(45) Date of Patent: Mar. 27, 2001

(54) LOAD SUPPORTING VARIABLE POSITIONING ELECTRICAL BOX SUITED FOR ATTACHING TO A JOIST

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/221,862

(22) Filed: Dec. 29, 1998

Related U.S. Application Data

(63) Continuation-in-part of application No. 08/371,695, filed on Jan. 12, 1995, now Pat. No. 5,854,443, and a continuation-in-part of application No. 08/905,142, filed on Aug. 1, 1997, now Pat. No. 5,981,874.
(60) Provisional application No. 60/023,060, filed on Aug. 2, 1996.

(51) Int. Cl.[7] .................................................. H01H 9/02
(52) U.S. Cl. ................................................ 174/58; 248/906
(58) Field of Search ...................... 174/48, 58; 220/3.2, 220/3.3, 3.9; 248/205.3, 906

(56) References Cited

U.S. PATENT DOCUMENTS

| | | |
|---|---|---|
| Re. 34,603 | 5/1994 | Caison et al. . |
| 950,176 | 2/1910 | Hublinger . |
| 1,066,706 | 7/1913 | Caine . |
| 1,819,460 | 8/1931 | Frank . |
| 1,824,708 | 9/1931 | Davis et al. . |
| 2,264,666 | 5/1941 | Hexdall . |
| 2,423,757 | 7/1947 | Dedge . |
| 2,959,633 | 11/1960 | Palmer et al. . |
| 2,973,175 | 2/1961 | Appleton . |
| 3,097,821 | 7/1963 | Richards . |
| 3,168,613 | 2/1965 | Palmer . |
| 3,340,349 | 9/1967 | Zerwes . |
| 3,616,096 | 10/1971 | Roeder . |
| 4,050,603 | 9/1977 | Harris et al. . |
| 4,140,293 | 2/1979 | Hansen . |
| 4,180,226 | 12/1979 | Matte . |
| 4,275,862 | 6/1981 | Takagi et al. . |
| 4,281,773 | 8/1981 | Mengeu . |
| 4,403,708 | 9/1983 | Smolik . |
| 4,408,696 | 10/1983 | Crosson . |
| 4,483,453 | 11/1984 | Smolik . |
| 4,747,506 | 5/1988 | Stuchlik, III . |
| 4,787,587 | 11/1988 | Deming . |
| 4,788,383 | 11/1988 | Caison . |
| 4,880,128 | 11/1989 | Jorgensen . |
| 4,909,405 | 3/1990 | Kerr, Jr. . |
| 4,960,964 | 10/1990 | Schnell et al. . |
| 4,988,067 | 1/1991 | Propp et al. . |

(List continued on next page.)

FOREIGN PATENT DOCUMENTS

| | | |
|---|---|---|
| 34 03 053 | 8/1985 | (DE) . |
| 2 436 518 | 4/1980 | (FR) . |
| 1 309 950 | 3/1973 | (GB) . |

*Primary Examiner*—Dean A. Reichard
(74) *Attorney, Agent, or Firm*—Shlesinger, Arkwright & Garvey LLP

(57) ABSTRACT

An electrical fixture mounting assembly includes a junction box having a wall defining a junction box cavity therein. There are provided one or more members on the wall for attaching the junction box to a support. The attachment members include spaced apart mounting brackets which are configured for engaging various sizes and shapes of supports. In addition, there may be provided adhesive members for supplementing and/or replacing the attachment members so that the fixture mounting assembly can be readily attached to a variety of surfaces. Additional features include features which transfer static and dynamic loads directly from a supported fixture to the mounting bracket and substantially without transferring such forces to the associated junction box. Depth indicators for various drywall thicknesses may be provided, as well as movable elements for accommodating different drywall thicknesses.

29 Claims, 12 Drawing Sheets

U.S. PATENT DOCUMENTS

| | | |
|---|---|---|
| 5,044,582 | 9/1991 | Walters . |
| 5,065,968 | 11/1991 | Kesler et al. . |
| 5,234,119 | 8/1993 | Jorgensen et al. . |
| 5,239,132 | 8/1993 | Bartow . |
| 5,303,894 | 4/1944 | Deschamps et al. . |
| 5,349,134 | 9/1994 | Russell . |
| 5,407,088 | 4/1995 | Jorgensen et al. . |
| 5,408,045 | 4/1995 | Jorgensen et al. . |
| 5,435,514 | 7/1995 | Kerr, Jr. . |
| 5,484,076 | 1/1996 | Petrushka . |
| 5,505,554 | 4/1996 | Lautenschläger et al. . |
| 5,522,577 | 6/1996 | Roesch . |
| 5,762,223 | 6/1998 | Kerr, Jr. . |
| 5,860,548 | 1/1999 | Kerr, Jr. . |
| 5,907,124 | 5/1999 | Reiker . |
| 5,909,006 | 6/1999 | Reiker . |
| 5,965,845 | 10/1999 | Reiker . |
| 5,981,874 | 11/1999 | Reiker . |
| 6,004,642 | 12/1999 | Langford . |

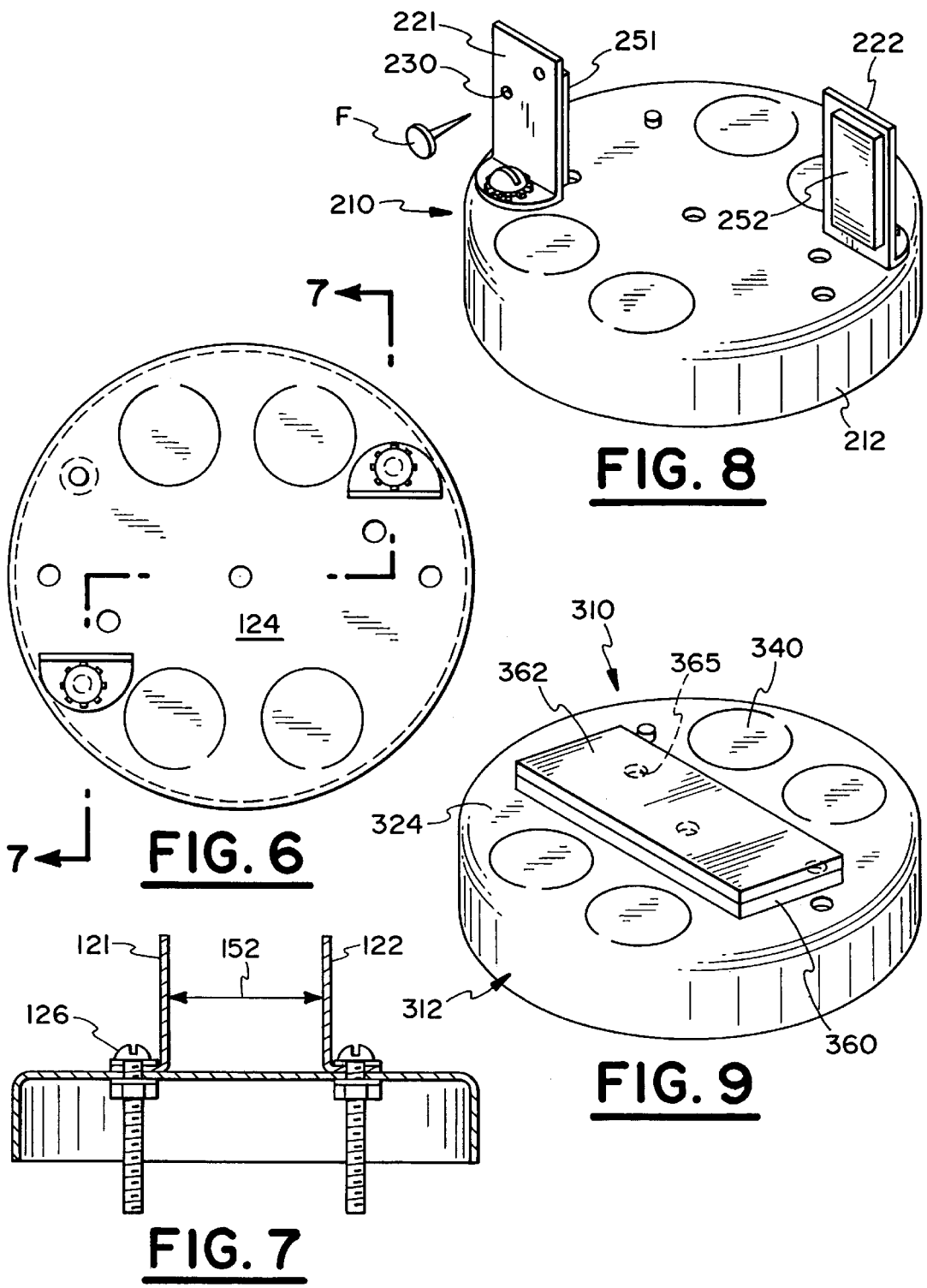

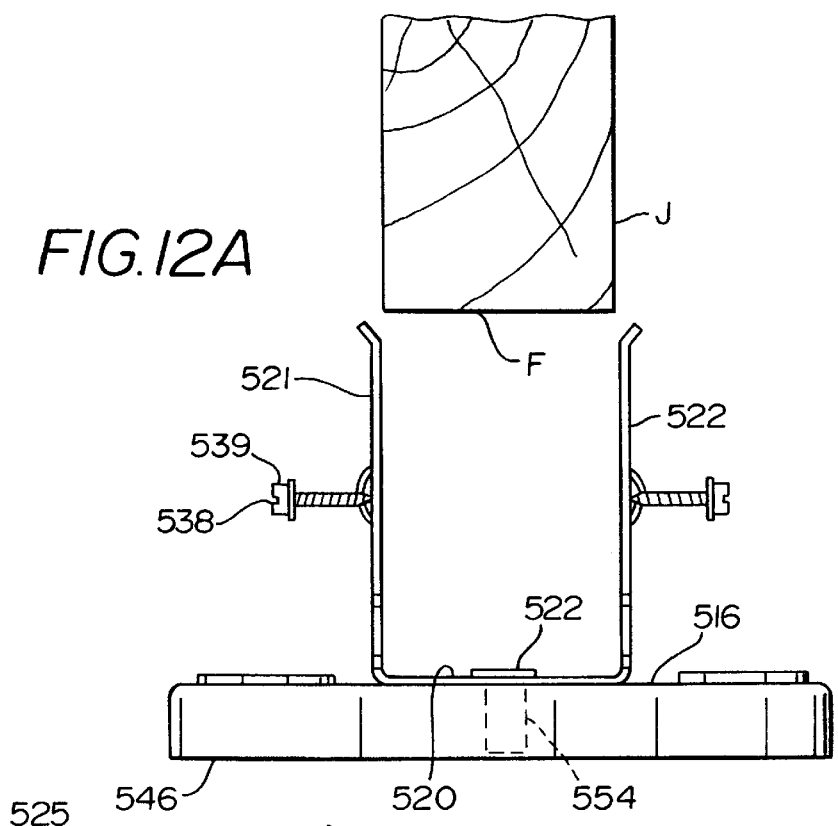
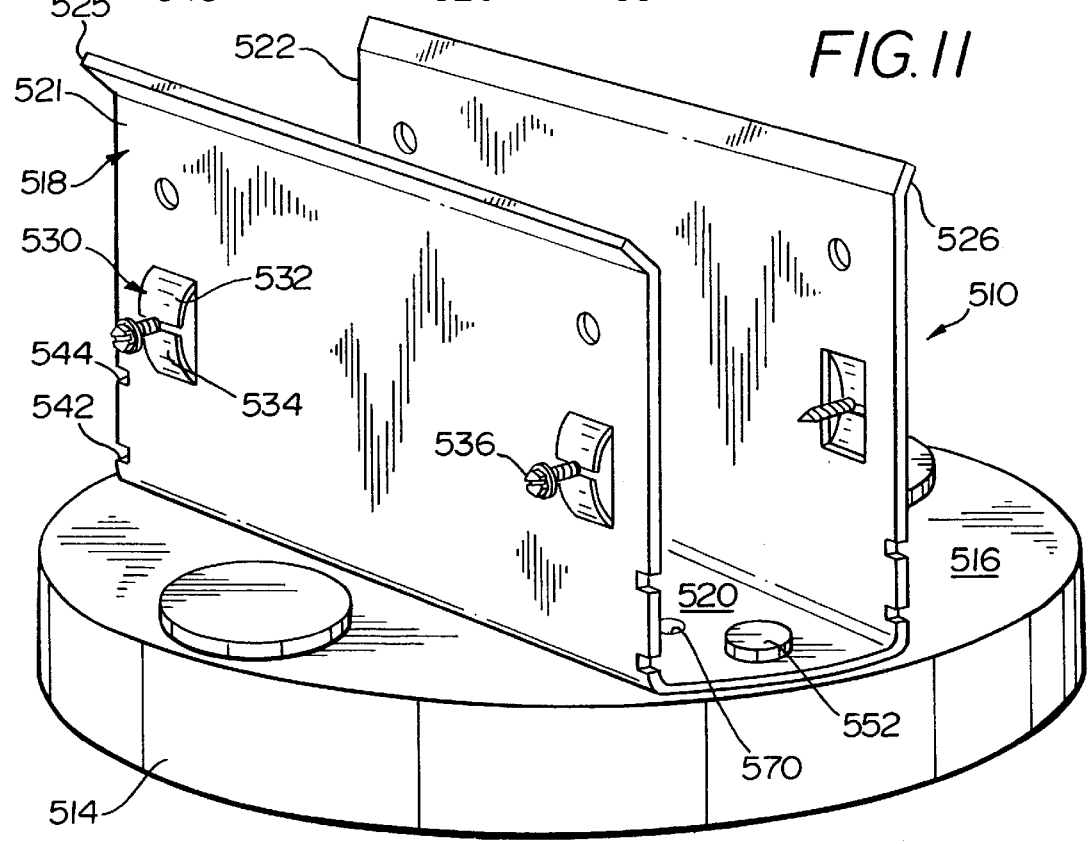

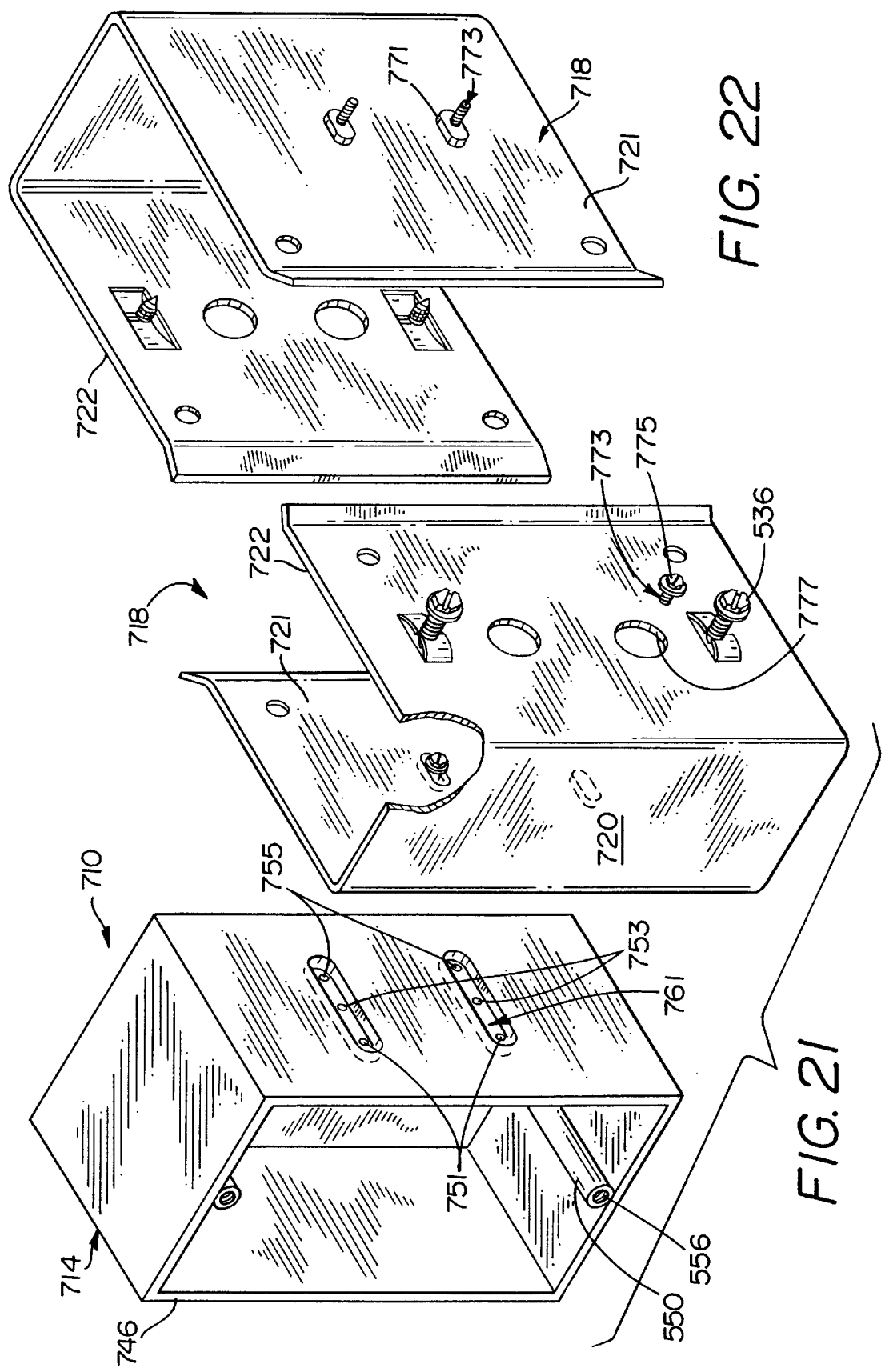

LOAD SUPPORTING VARIABLE POSITIONING ELECTRICAL BOX SUITED FOR ATTACHING TO A JOIST

CROSS-REFERENCE TO RELATED APPLICATIONS

This application is a continuation-in-part of U.S. Application Ser. No. 08/371,695, filed Jan. 12, 1995, now U.S. Pat. No. 5,854,443, issued Dec. 29, 1998, entitled "LOAD SUPPORTED ELECTRICAL BOX SUITED FOR ATTACHING TO A JOIST", which is incorporated herein.

This application is a continuation-in-part of U.S. Application Ser. No. 08/905,142, filed Aug. 1, 1997, now U.S. Pat. No. 5,981,874, issued Nov. 9, 1999, entitled "ELECTRICAL BOX WITH DIMPLED HOLE AND SUPPORT FOR CARRYING FIXTURES", which claims the priority of U.S. Provisional Application Ser. No. 60/023,060, filed Aug. 2, 1996, and each of which is incorporated herein.

FIELD OF THE INVENTION

This invention relates to a fixture mounting assembly and a junction box for installation on wall, floor, or ceiling joists.

BACKGROUND OF THE INVENTION

Conventional junction boxes are known for mounting to elongated supports, such as ceiling joists and studs in walls.

There have even been a few prior art designs for attaching junction boxes to ceiling joists that are intended to carry the weight of an electrical fixture, such as a chandelier or ceiling fan. Such fixtures are becoming heavier nowadays, and building codes are becoming more strict. In addition, the marketplace is becoming increasingly competitive. Furthermore, homeowners are doing more retrofit installations of such junction boxes and fixtures, and easily and accurately installed devices are especially appropriate for use by lay people.

Thus, there is a need for a junction box which is suitable for carrying large static and dynamic loads, is easy to install, is inexpensive to manufacture, and can be installed regardless of the shape and profile of the horizontal joist or vertical stud.

There is likewise a need for a junction box which can be attached in various positions relative to a joist, such as on the side of a joist and on the face of a joist. There is likewise a need for a single thickness junction box which can be installed on a mounting assembly that accommodates different thicknesses of drywall while maintaining the desired face of the junction flush with the outer face of the drywall or plaster board or sheetrock.

Thus, it can be seen that there is a need for an electrical fixture mounting assembly having an electrical box that is engineered for use under high static and dynamic load conditions, which is easy to install, and simple and inexpensive to manufacture, which transfers the weight and forces of static loads (e.g., chandeliers) and dynamic loads (e.g., ceiling fans) directly to the support (e.g., the stud or joist) and substantially without applying forces to the electrical box. There is also a need for a mounting assembly which provides for installation of the same electrical box associated with the same mounting bracket, yet which accommodates a variety of thicknesses of drywall or sheetrock and which provides for flush mounting of the electrical box with the face of the various thicknesses of drywall.

There is likewise a need for a mounting assembly of the abovedescribed types which provide for "hands-free" installation, i.e., which may be temporarily attached and then permanently or detachably attached while the temporary attachment allows the use of both of the installers hands.

Still further, there is a need for mounting brackets suited for attachment to irregularly shaped joists.

OBJECTS AND SUMMARY OF THE INVENTION

Accordingly, it is an object of the invention to provide an electrical fixture mounting assembly which overcomes the drawbacks and disadvantages of the prior art devices.

A further object of the invention is to provide an electrical fixture mounting assembly which is suited for use in walls, floors, and ceilings, regardless of the configuration of the stud or joist to which the electrical fixture mounting assembly is attached.

Another object of the invention is to provide an electrical fixture mounting assembly which can be inexpensively manufactured.

A still further object of the invention is to provide an electrical fixture mounting assembly having a junction box that is engineered so that large static and dynamic loads are transferred directly to the joist or stud on which the junction box is installed, as opposed to transferring forces to the junction box itself.

A further object of the invention is to provide an electrical fixture mounting assembly suited for use in new construction as well as for retrofitting in existing walls and ceilings.

Another object of the invention is to provide an electrical fixture mounting assembly which is more resistant to oxidation and rusting then earlier devices.

Yet another object of the invention is to provide an electrical fixture mounting assembly which is easier and faster to install and to use than conventional devices.

Yet a further object of the invention is to provide an electrical fixture mounting assembly having an attachment site to which fixtures can be more readily attached than with conventional devices.

It is a still further object of the invention to provide an electrical fixture mounting assembly which can be temporarily attached, as well as permanently attached, to a variety of supports.

A still further object of the invention is to provide an electrical fixture mounting assembly which is suited for "singlehanded" installation.

Another object of the invention is to provide an electrical fixture mounting assembly which can be readily installed by one person.

Another object of the invention is to provide an electrical fixture mounting assembly which is quicker to install than conventional electrical fixture mounting assemblies.

A further object of the invention is to provide an electrical fixture mounting assembly which transfers the weight and forces of static loads and dynamic loads substantially directly to the support to which it is attached a fixture which it supports and without applying such static and dynamic forces to its associated electrical box.

Another object of the invention is to provide an electrical fixture mounting assembly which provides for installation of the same electrical box associated with a mounting bracket of the assembly, yet which assembly accommodates a variety of thicknesses of drywall and which provides for flush mounting of the electrical box with the face of the various thicknesses of drywall.

A still further object of the invention is to provide an electrical fixture mounting assembly having spaced apart fixture fasteners for supporting the load of a fixture, such as a chandelier or ceiling fan.

Another object of the invention is to provide an electrical fixture mounting assembly which has indicators for guiding the installer as to the manner in which the assembly should be used for accommodating different thicknesses of sheetrock or drywall or another finishing material.

A further object of the invention is to provide an electrical fixture mounting assembly having one or more of temporary attachment elements, detachable permanent attachment elements, and permanent attachment elements for attaching the assembly to a joist and the like.

A yet still further object of the invention is to provide an electrical fixture mounting assembly that has an associated junction box which may be attached to the side of a bracket for mounting on the side of a stud or joist as opposed to mounting on the outer face of a stud or joist facing toward an open room.

In summary, therefore, the invention is directed to an electrical fixture mounting assembly which is strong, easily and speedily used, and which overcomes the drawbacks of the prior art devices.

In one embodiment of the invention, there is provided an electrical fixture mounting assembly having a junction box, the junction box including a wall defining a junction box cavity therein. There is means disposed on the wall for engaging the junction box with opposite sides of an irregularly shaped joist.

In another embodiment of the invention, there is provided an electrical fixture mounting assembly including a junction box having a wall defining a junction box cavity therein. There is a first mounting bracket on the wall that is configured for attaching to a joist. A second mounting bracket is provided that is likewise configured for attaching to a joist. The first and second mounting brackets are spaced apart and configured and positioned relative to each other for engaging opposite sides of an irregularly shaped joist.

In yet another preferred embodiment of the invention, there is provided an electrical fixture mounting assembly including a junction box. The junction box has a wall defining a junction box cavity therein, and means is disposed on the wall for adhering the junction box to opposite sides of a joist.

In yet another preferred embodiment of the invention, there is provided an electrical fixture mounting assembly including a junction box. The junction box has a wall defining a junction box cavity therein, and means is disposed on the wall for adhering the junction box to the bottom of a joist.

The term "temporary attachment", as in the phrase "temporary attachment element" means an element which is not intended for permanent attachment to a surface. For example, a piece of double-sided tape is meant that is used to temporarily attach the mounting assembly to a surface while the installer has both hands free for holding tools and permanent fasteners for then permanently attaching the assembly to the surface or an object, such as a joist. This will be appreciated from reading through the description below.

The term "detachably attached", such as in the phrase "detachably attached permanent attachment element" means, for example, a screw which permanently secures the mounting assembly according to the invention to an object, such as a joist, yet which screws can be readily unscrewed for detaching the assembly from the joist to which it is permanently attached for all intents and purposes.

The term "permanently attached" attachment element is meant to include attaching elements, such as nails, which, although removable from a joist, may be considered to be more difficult to remove from a joist than a screw, depending on one's expertise in removing nails.

The term "irregularly shaped joist" includes supports which are non-linear, are warped, have surface irregularities, and the like, for example.

The invention will be further described with reference to the following drawings.

BRIEF DESCRIPTION OF THE DRAWINGS

FIG. 6 is a top plan view of the preferred embodiment of FIG. 5;

FIG. 7 is a sectional view of the preferred embodiment of FIG. 6 taken along line 6—6 therein;

FIG. 8 is a perspective view of a still further preferred embodiment of an electrical fixture mounting assembly according to the invention;

FIG. 9 is a perspective view of a yet still further preferred embodiment of the electrical fixture mounting assembly according to the invention;

FIG. 11 is a perspective view of a further preferred embodiment of the electrical fixture mounting assembly according to the invention;

FIG. 12A is a side elevational view of the preferred embodiment of the electrical fixture mounting assembly of FIG. 11;

FIG. 21 is an exploded, top perspective view of yet another preferred embodiment of an electrical fixture mounting assembly according to the invention; and FIG. 22 is a rear perspective view of the preferred embodiment of the mounting bracket of the mounting assembly of FIG. 21.

DETAILED DESCRIPTION OF THE INVENTION

Figure 1:
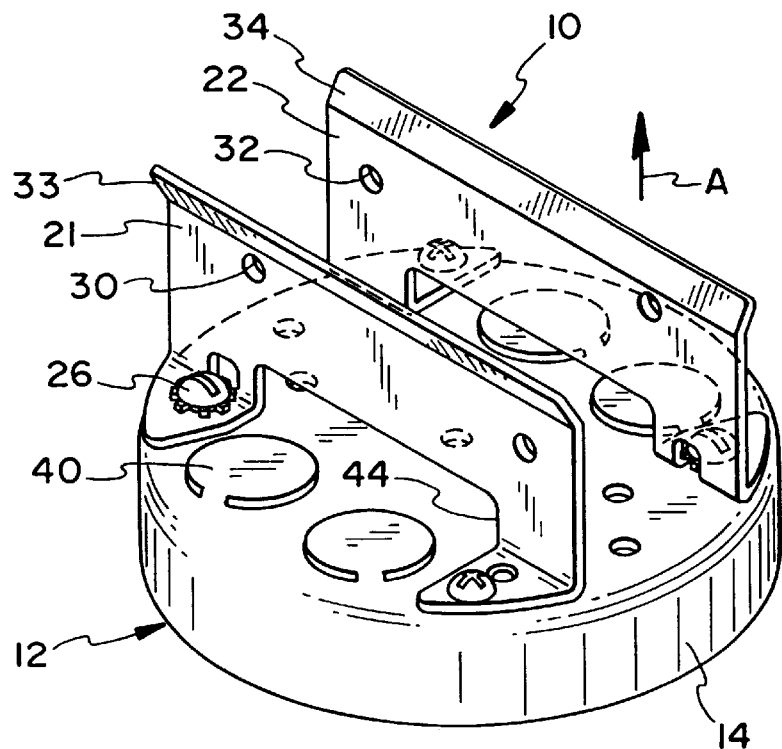
FIG. 1 is a perspective view of a first preferred embodiment of an electrical fixture mounting assembly according to the invention.
Figure 2:
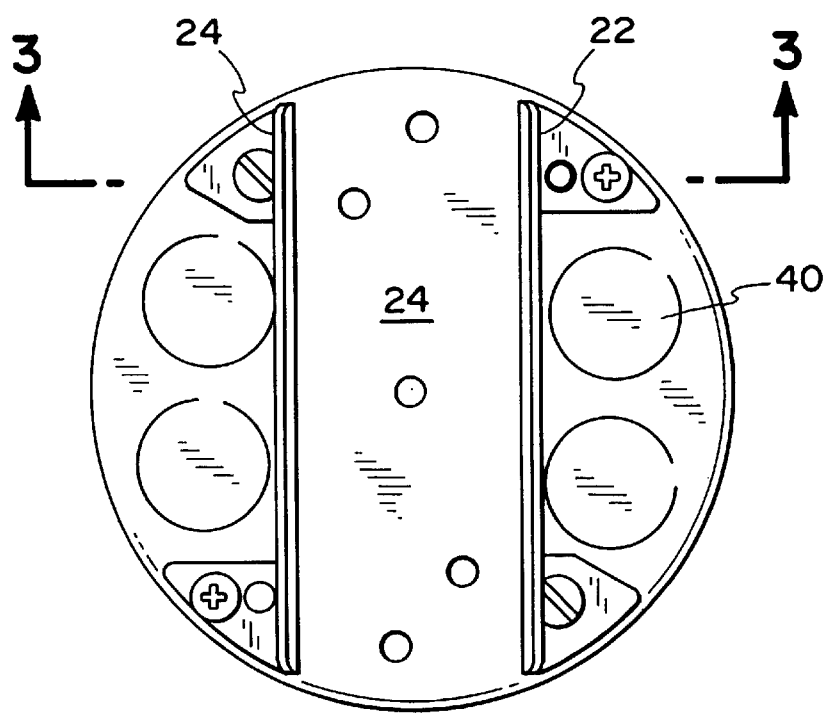
FIG. 2 is a top plan view of the preferred embodiment of the electrical fixture mounting assembly of FIG. 1.

Turning to FIGS. 1–4, a first preferred embodiment of an electrical fixture mounting assembly 10 according to the invention will be described.

Electrical fixture mounting assembly 10 includes a junction box 12 having a wall 14 defining a junction box cavity therein. There is provided a means for engaging opposite sides of an irregularly shaped joist, for example. Such engaging means includes a first mounting bracket 21 and a second mounting bracket 22 extending outwardly from an upper wall 24 of junction box 12.

Good results have been achieved when first and second mounting brackets 21, 22 were variably fixedly attached to upper wall 24 by fasteners 26, such as screws 27 and locking washers 28. It is likewise contemplated that first and second mounting brackets 21, 22 will be more rigidly attached to junction box 12, such as by riveting, welding, and the like.

Fasteners 26 are preferably sufficiently strong so that a fixture such as a ceiling fan or chandelier can be supported thereby. For example, screw 27 will be configured for supporting a fixture, such as a ceiling fan or a chandelier. Screw 27 typically extends past box 12. It will be appreciated that screw 27 will transfer the weight of an attached fixture directly to first mounting bracket 21, without exerting any of such weight on junction box 12. Bracket 21, when installed, will thus directly transfer the weight of a fixture supported by screw 27 to a support S (i.e., by exerting substantially none of the weight of the fixture on junction box 12).

Each of first and second mounting brackets 21, 22 may include one or more holes 30 through which a fastener will be inserted for permanently mounting electrical fixture mounting assembly 10 to a support member, such as a stud. Optional sharp extensions of material or "blowouts" 32 can be provided on one or more of first and second mounting brackets 21, 22 for temporarily securing electrical fixture mounting assembly 10 to a support member.

Preferably, an outwardly extending flange 33 will be provided on the free end of first mounting bracket 21. Flange 33 will typically extend transversely relative to the remainder of first mounting bracket 21.

Furthermore, it is contemplated that a second flange 34 will be provided on the free end of second mounting bracket 22. Flange 34 extends transversely relative to the remainder of second mounting bracket 22. Good results have been achieved when first and second flanges 33, 34 extend outwardly away from the middle of electrical fixture mounting assembly 10. As can be appreciated from considering FIG. 4, in use, flanges 33 and 34 will extend outwardly away from a support S to which they are attached, for reasons which will be explained in detail under OPERATION below.

An electrical grounding connector 36 may be provided.

Likewise, one or more removable plates or "knockouts" 40 will typically be provided in wall 14 of junction box 12.

Conveniently, an opening 44 is defined in first and second mounting brackets 21, 22 to both accommodate the removal of knockouts 40 and to provide room for inserting electrical wires, cables, and ROMEX™ connectors in the openings left by the removal of knockouts 40.

As will be readily appreciated, first mounting bracket 21 is offset from second mounting bracket 22 by a distance 52 selected to accommodate the support member S to which electrical fixture mounting assembly 10 will be attached. Thus, in the case where electrical fixture mounting assembly 10 is to be attached to a conventional 2"×4" wooden stud having a nominal width nowadays of less than two inches, offset 52 will be less than about two inches more or less. Good results have been achieved when offset 52 is less than the width of the support with which first and second mounting brackets 21, 22 will engage. By making offset 52 less than the expected width of the support, the support S will positively engage first and second mounting brackets 21, 22 and force them apart so that first and second mounting brackets 21, 22 firmly engage support S.

Figure 3:
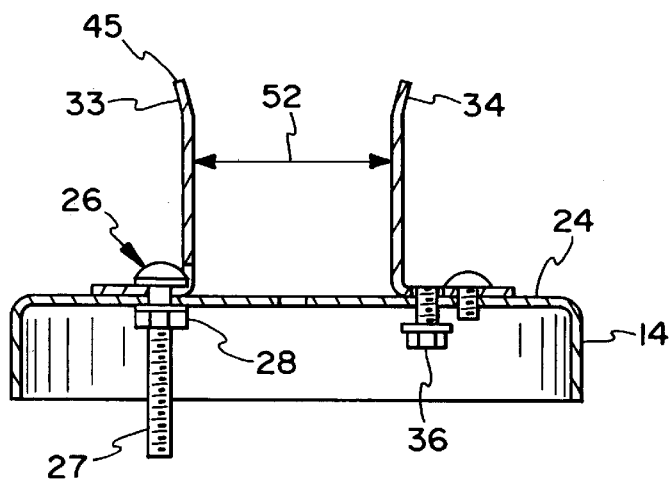
FIG. 3 is a sectional view of the electrical fixture mounting assembly of FIG. 2, taken along line 3—3 therein.
Figure 4:
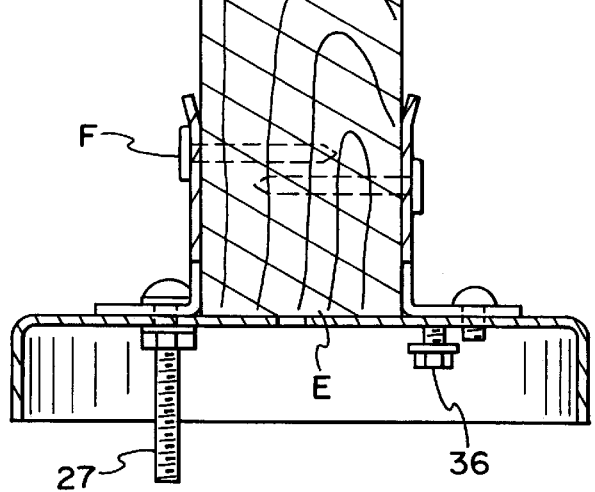
FIG. 4 is a side elevational view of the preferred embodiment of the electrical fixture mounting assembly of FIG. 1, when installed.

In the example of my preferred embodiment as shown in FIGS. 3 and 4, flanges 33, 34 extend outwardly away from the center of electrical fixture mounting assembly 10, as such orientation of flanges 33 and 34 has provided good results when electrical fixture mounting assembly 10 is used with wooden studs S. By providing the outwardly flared opening established by flanges 33, 34, stud S tends to be guided into engagement with wall 24. Thus, in use a first mounting bracket 21 which is "misaligned" with stud S is less likely to have an outermost end 45 engage with stud S (e.g. with a lower free end E) during insertion.

Figure 5:
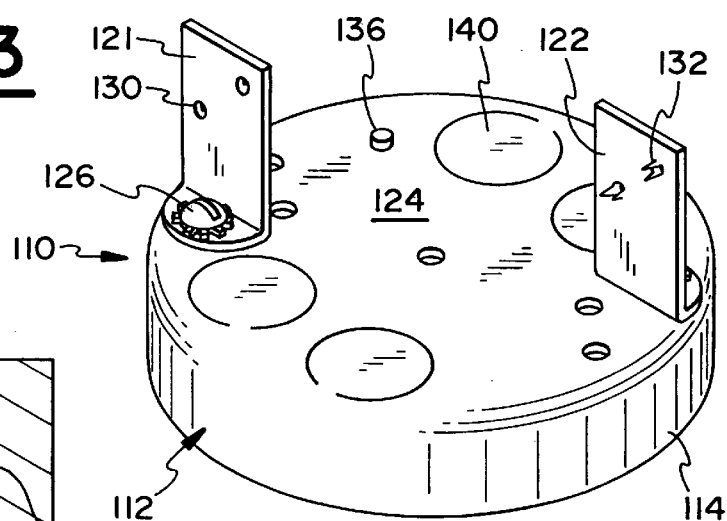
FIG. 5 is a perspective view of an electrical fixture mounting assembly according to a further preferred embodiment of the invention.

Turning now to FIGS. 5–7, a further preferred embodiment of an electrical fixture mounting assembly 110 according to my invention is shown.

Electrical fixture mounting assembly 110 includes a junction box 112 having a wall 114 for defining a junction box cavity. There is provided a means for engaging opposite sides of a support member, such as an irregularly shaped joist. Such engaging means includes a first mounting bracket 121 and a second mounting bracket 122 extending outwardly from an upper wall 124 of junction box 112. Good results have been achieved when first and second mounting brackets 121, 122 were variably fixedly attached to upper wall 124 by fasteners 126, such as sheet metal screws and locking washers. It is likewise contemplated that first and second mounting brackets 121, 122 will be more rigidly attached to junction box 112, such as by riveting, welding, or the like.

Each of first and second mounting brackets 121, 122 includes one or more holes 130 through which a fastener will be inserted for permanently mounting electrical fixture mounting assembly 110 to a support member, such as a stud. Optional sharp extensions of material or "blowouts" 132 can be provided on one or more of first and second mounting brackets 121, 122 for temporarily securing electrical fixture mounting assembly 110 to a support member.

An electrical grounding connector 136, the free end of which is visible in FIG. 5, will typically be provided. Likewise, one or more removable plates or "knockouts" 140 will typically be provided in wall 114 of junction box 112.

Preferably, first and second mounting brackets 121, 122 are sufficiently small to both accommodate the removal of knockouts 140 and to provide room for inserting electrical wires, cables, and ROMEX™ connectors in the openings left by the removal of knockouts 140. In addition, the size of first and second mounting brackets 121, 122 will allow for assembly 110 to be attached to a wide variety of support members of varying width.

As will be readily appreciated, first mounting bracket 121 is offset from second mounting bracket 122 by a distance 152 selected to accommodate the support member to which electrical fixture mounting assembly 110 will be attached. Thus, where electrical fixture mounting assembly 110 is to be attached to a conventional wooden 2"×4" stud having a nominal width of two inches, offset 152 will be about that nominal width of two inches more or less.

The provision of detachable fasteners 126 allows for the orientation of first and second mounting brackets 121, 122 to be adjusted, and for brackets 121, 122 to be removed, as desired.

FIG. 8 illustrates a yet still further preferred embodiment of an electrical fixture mounting assembly 210 according to the invention.

Electrical fixture mounting assembly 210 includes a junction box 212 having a first mounting bracket 221 extending outwardly therefrom.

A second mounting bracket 222 may likewise be provided. Good results have been achieved when second mounting bracket 222 is spaced apart from first mounting bracket 221. By spacing apart first and second mounting brackets 221, 222, a large variety of widths of supports can be accommodated, as well as irregularly shaped supports.

Means is provided for adhering first mounting bracket 221 to a support. The adhering means can be provided in the form of a piece of tape 251, which tape has an adhesive thereon sufficiently strong to support the weight of electrical fixture mounting assembly 210.

It is contemplated that a second adhesive means be provided on second mounting bracket 222. Second adhesive means may likewise be a piece of tape 252.

Preferably, the adhesive provided on tape 251 is sufficiently strong to support electrical fixture mounting assembly 210 for a period of time long enough for a user to permanently attach electrical fixture mounting assembly 210 to a support by use of a fastener F inserted through a hole 230 provided in first mounting bracket 221. Likewise, when second adhesive means 252 is provided, the adhesive of at least first and second adhesive means collectively will be sufficiently strong to temporarily support electrical fixture mounting assembly 210 to a support while a user is permanently fastening assembly 210 to the support. Fastener F may likewise be inserted from below in all embodiments, such as through hole 365 in the embodiment of FIG. 9. Fasteners F are typically screws or nails. A yet still further embodiment of an electrical fixture mounting assembly 310 according to my invention is shown in FIG. 9. Electrical fixture mounting assembly 310 includes a junction box 312 having an upper wall 324. Knockouts 340 will typically be provided in upper wall 324.

Means is provided for adhering electrical fixture mounting assembly 310 to a support surface; for example, such adhering means has been successfully provided by the use of a piece of tape 360. Good results have been achieved by the use of so-called doublesided tape which includes a piece of release paper 362 covering the adhesive on the outer face of tape 360, until such time as electrical fixture mounting assembly 310 is to be installed.

FIG. 9 shows electrical fixture mounting assembly 310 with a piece of double-sided tape 360 already mounted on upper wall 324 by the adhesive on the side of tape 360 opposite to the side on which illustrated release paper 362 remains.

Preferably, adhesive tape 360 will be disposed between knockouts 340 for avoiding interference therewith. The adhesive used on tape 360 is preferably sufficiently strong to support electrical fixture mounting assembly 310 during the time it takes a user to fixedly attach electrical fixture mounting assembly 310 to a support by inserting fasteners through mounting holes 365 after tape 360 has been adhered to the mounting surface. Expected mounting surfaces include the faces of wooden and steel wall studs and joists, for example. Thus, any patch of glue, putty, or adhesive, such as a spray-on adhesive, is expected to be used in addition to, or instead of, adhesive tape 360.

Figure 10:
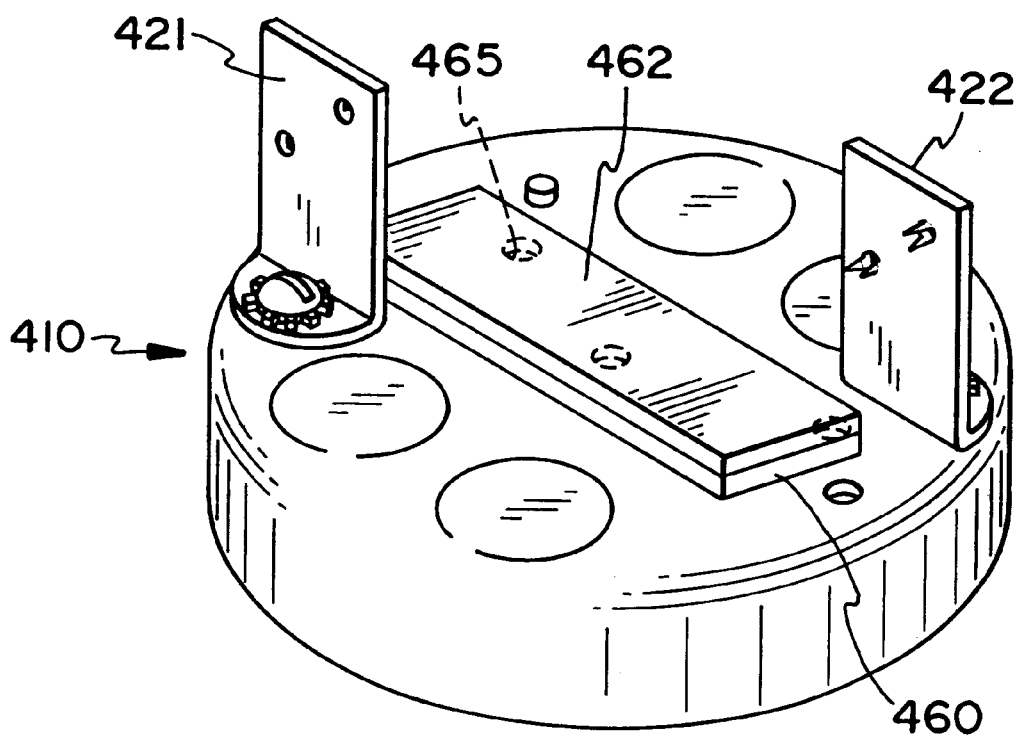
FIG. 10 is a perspective view of another preferred embodiment of the electrical fixture mounting assembly according to the invention.

FIG. 10 shows an electrical fixture mounting assembly 410 with a piece of double-sided tape 460 mounted on the wall, as in the embodiment of FIG. 9. A release paper 462 is provide on tape 460. First and second mounting brackets 421 and 422 are included on mounting assembly 410, such as shown in the embodiment of FIG. 5. A fastener may be inserted through mounting hole 465 for permanent or semi-permanent attachment of mounting assembly 410 to a joist, as discussed regarding earlier embodiments.

FIGS. 11–18 illustrate another preferred embodiment of the electrical fixture mounting assembly 510 according to the invention.

Mounting assembly 510 typically includes a junction box 514 and a mounting bracket 518 disposed thereon.

Mounting bracket 518 has a mounting or connecting portion 520 disposed between left and right mounting brackets 521 and 522, respectively. Left mounting bracket 521 may be provided with an outwardly flared portion 525 along a free edge thereof, and right mounting bracket 522 may be provided with a similar outwardly flared guide or flared edge 526. As will be appreciated from considering FIGS. 12A, 15A, and 15B, for example, outwardly flared portions 525, 526 assist in the installation of mounting assembly 510 on a joist J. Such outwardly flared portions are particularly useful when joist J is irregularly shaped, such as discussed above in regard to other embodiments.

One or more elements 530 are provided for detachably attaching mounting assembly 510 to joist J. Attachment element 530 may include an upper tab 532 and a lower tab 534. Collectively, tabs 532 and 534 define a female fastener into which a detachably attachable fastener, such as the illustrated screw 536 extends. Tabs 532 and 534 may be formed by punching out material from the mounting brackets. By configuring the tabs as illustrated, sufficient resiliency may be obtained for retaining screw 536 during shipment, as well as during installation when the user inserts a screwdriver into slot 538 of fastener 536 or uses a socket wrench to engage the faces 539 of the head thereof.

Preferably one or more depth indicators or fire wall thickness or drywall thickness indicators 542 and 544 are provided. Box 514 has a thickness D1 which serves as a thickness indicator, such as for a thickness of one (1) inch. A lower thickness indicator 542 is provided at a distance D2 relative to a lower free edge or outer face 546 of junction box 514. Lower free edge 546 corresponds to the face of junction box 514 which will be flush with the outer wall O of the installed drywall, for example. Likewise, second thickness or depth indicator 544 indicates a further thickness D3. See FIGS. 16–18.

Junction box 514 may be attached to bracket 518 by any standard means. Good results have been achieved when a stud 550 having a head 552 and a shaft 554 is provided. Shaft 554 may be a threaded shaft for receiving and securing a fastener of a fixture, such as a chandelier of a light fixture. Preferably, shaft 554 includes internal or female threads 556. By use of female threads 556, shaft 554 may have a sufficiently smooth exterior so that the outer surface does not abrade or cut the insulation of electrical wires disposed inside junction box 514 during use. Thus, use of the box will comply with current electrical codes in the United States, such as Underwriter's Laboratory (UL) requirements. Please see FIG. 12B for details of female threads 556.

Stud 550 may be press fit into one or both of mounting portion 520 of bracket 518 and top face 516 of junction box 514 so that the two are held together.

Alternatively, stud 550 may be installed immediately prior to use and the attachment of the fixture will pull all the components together and keep everything in place.

The use of stud 550 solves one of the problems of the prior art by providing for the transfer of static and dynamic loads from a supported fixture directly through studs 550 and to mounting brackets 518 substantially without transferring any of such static and dynamic forces onto junction box 514 itself. Thus, chandeliers and ceiling fans over 35 pounds may be supported in compliance with current electrical codes in the United States, such as the NEC. Specifically, the weight of a supported electrical fixture, such as a ceiling fan, will be transferred from its unillustrated male fasteners to the threads of female fasteners 556, then through body 554 and head 552 of stud 550 and thus to portion 520 of bracket 518. The forces applied on portion 520 are transferred to left and right mounting brackets 521 and 522 and thus to screws 536 and/or nails 580. Thanks to the frictional forces between the inner faces of left and right mounting brackets 521, 522 and joist J, some of the forces will be transferred by such frictional engagement therebetween. It will thus be seen that essentially none of the static and dynamic forces exerted by supported fixtures, such as ceiling fans, will be transferred to junction box 514 itself.

Figure 12B:
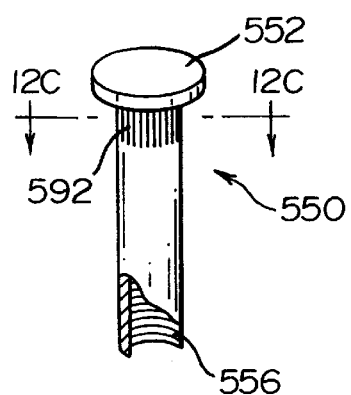
FIG. 12B–12D illustrates various components of FIG. 11, on an enlarged scale.
Figure 12C:
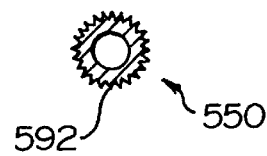
Figure 12D:
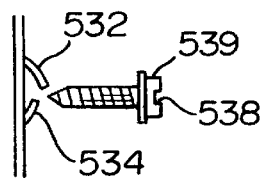
Figure 13:
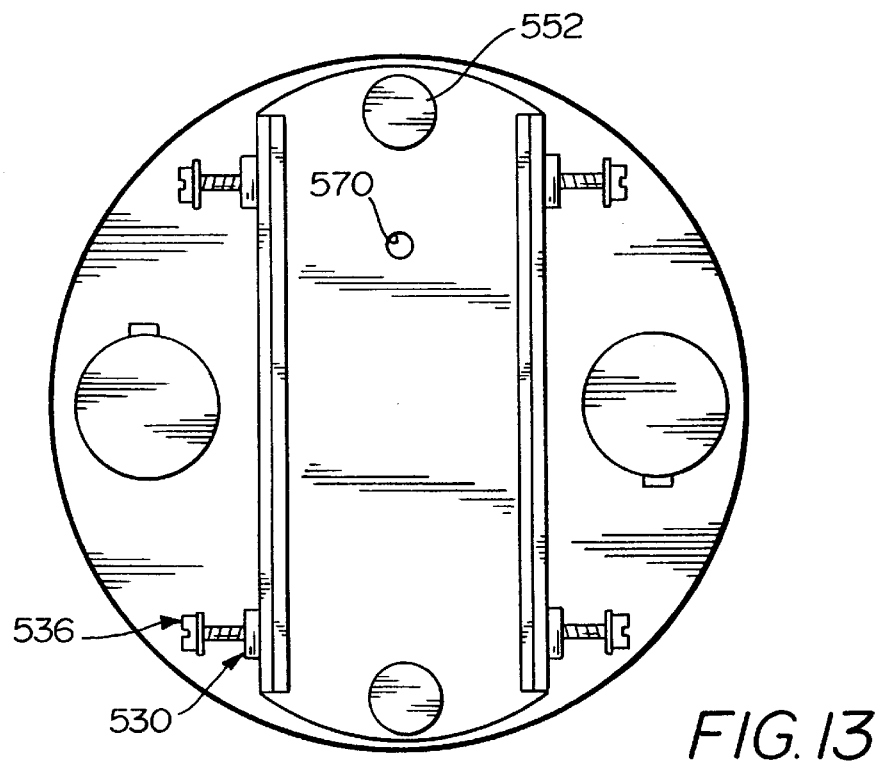
FIG. 13 is a top plan view of the preferred embodiment of FIG. 11.
Figure 14:
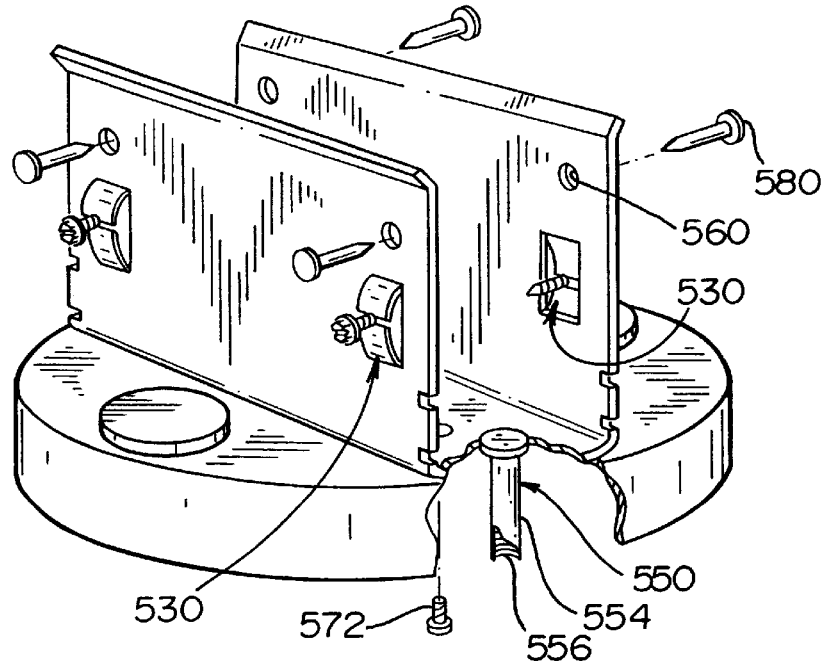
FIG. 14 is a further perspective view of the embodiment of FIG. 11, illustrating details thereof.

FIGS. 12B, 12C, and 12D illustrate details of certain features of mounting assembly 510 of the FIG. 11 embodiment.

FIG. 12B illustrates female stud 550 on an enlarged scale, showing female stud 550 when it is the type having a roughened surface, such as a plurality of flutings 592 for digging into and engaging with the material of middle element 520 and top wall 516.

FIG. 12C is a sectional view of FIG. 12B.

FIG. 12D is an enlarged view of upper tab 532, lower tab 534, and screw 536 described above for ease of understanding.

Figure 19:
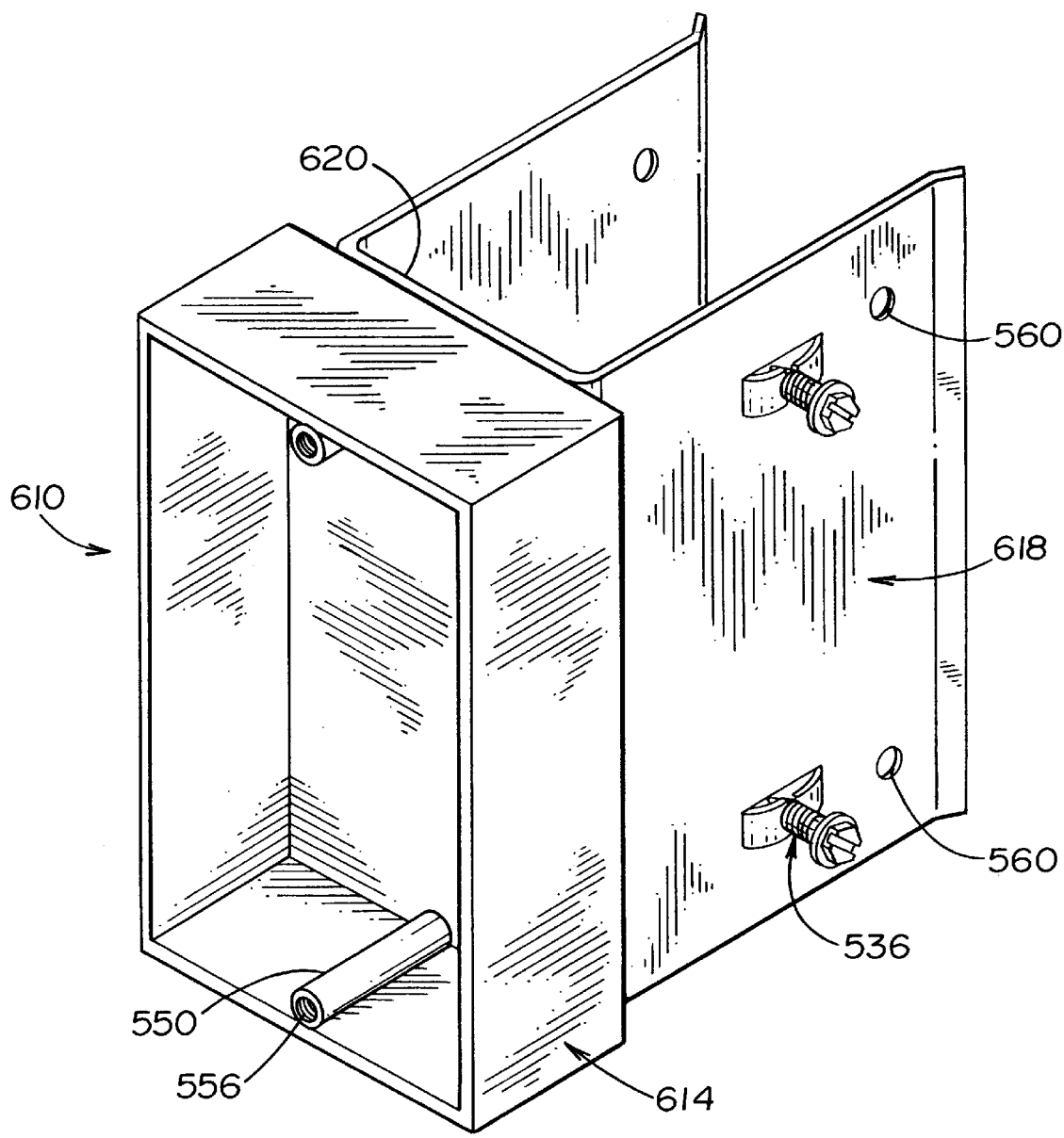
FIG. 19 is a perspective view of another preferred embodiment of an electrical fixture mounting assembly according to the invention.
Figure 20:
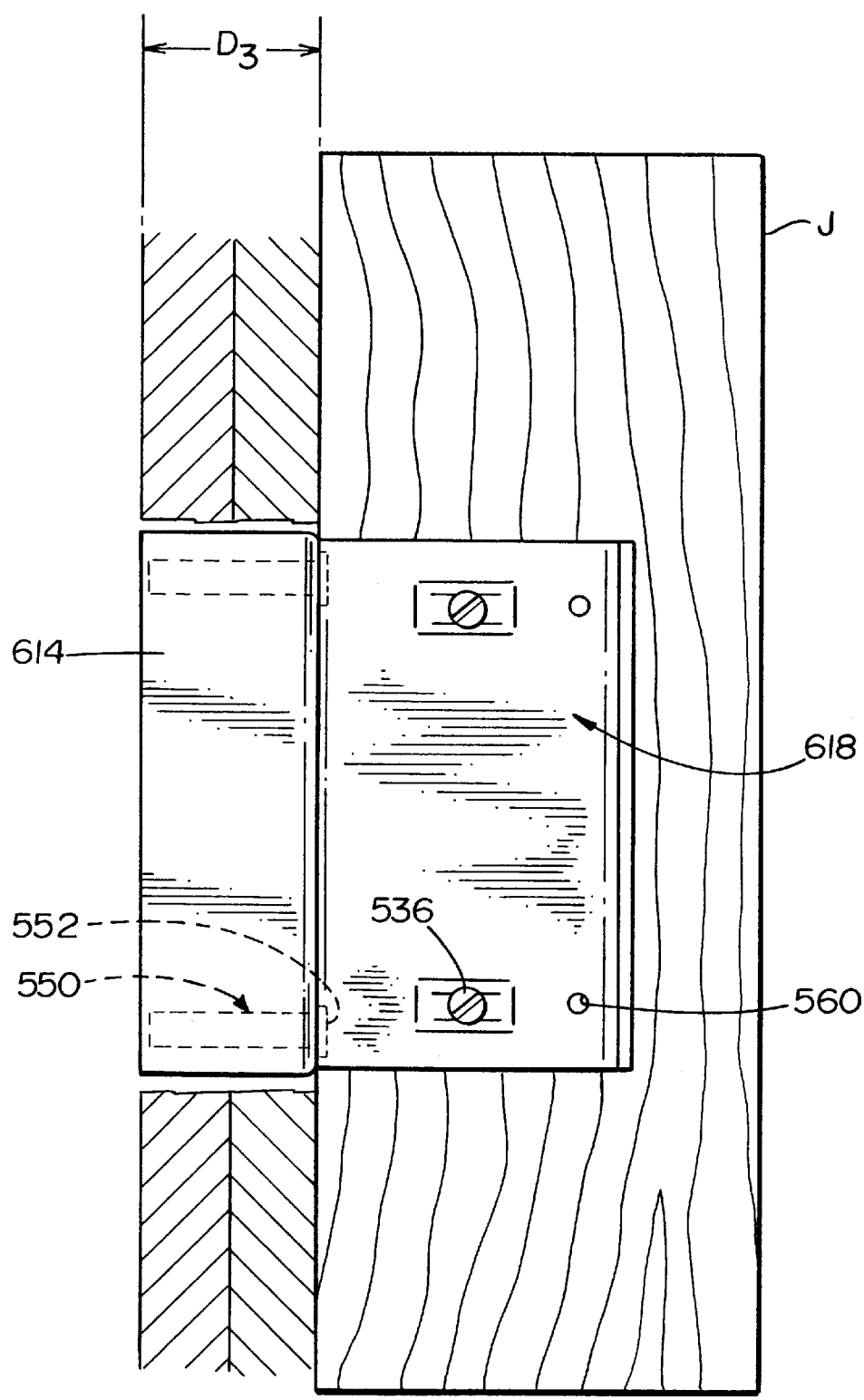
FIG. 20 is a side view of the preferred embodiment of FIG. 19 detachably permanently attached to a joist with one inch fire wall in place.

FIGS. 19 and 20 illustrate a further preferred embodiment of an electrical fixture mounting assembly 610 according to the invention.

Mounting assembly 610 includes an electrical box 614 which may have a thickness equivalent to the thickness of two standard ½ inch pieces of drywall nailed together to create a common fire wall such as in an apartment building. Thus, the thickness D3, as shown in FIG. 20, would be a typical thickness or height of electrical box 614.

Mounting bracket 518 may be made as in the embodiment of FIGS. 11–18.

In short, mounting assembly 610 may include studs 550 having female threads 556 to which the fasteners of an unillustrated electrical fixture may be attached in use. FIG. 20 shows mounting assembly 610 attached to joist J by means of fasteners 536. No nails 580 (FIG. 14) have been pounded into holes 560.

The embodiment of FIG. 19 and 20 is useful for apartment construction, and other uses where only one standard thickness of finishing wall, such as drywall is required. To that end, it will be seen that no depth gauges or thickness indicators 542 and 544, as in the embodiment of FIG. 11–18, are provided on mounting brackets 618.

Turning now to FIGS. 21 and 22, a still further preferred embodiment of an electrical fixture mounting assembly 710 is shown.

Mounting assembly 710 includes a junction box 714 detachably attachable to U-shaped mounting bracket 718.

Electrical box 714 may be securely attached to either one of left mounting bracket 721 or right mounting bracket 722. In that manner, the installer has greater options as to how to install the mounting assembly and, specifically, electrical box 714 for being in place to receive an electrical fixture, such as a receptacle or chandelier.

As shown in FIG. 21, box 714 is in place for being mounted to is left mounting bracket 721.

Another feature of mounting assembly 710 is that box 714 is positionable at various positions (3 in the illustrated embodiments) for varying the offset or distance between a free edge 746 and base 720 of U-shaped bracket 718. In that manner mounting assembly 710 can accommodate three different standard thicknesses of drywall, such as U.S. standards ½,⅝, and 1-inch thick drywall. Specifically, three hole spaced rearwardly away from front three inch 746 are provided: a first hole 751 for use when ½-inch drywall is to be used as the finishing wall; a second hole 753 for use when ⅝-inch drywall is to be used; and a third hole 755 when 1-inch drywall is to be used. As illustrated, pairs of respective holes 751, 753, and 755 may be provided for strength and stability, if desired.

Preferably, holes 751, 753, and 755 are provided in a further inwardly inset hole 761 in the side of junction box 714. By inwardly inset it is meant inset toward the interior of electrical box 714. In that manner, outwardly extending protrusions 771 may be received substantially within inwardly inset hole 761. As illustrated, outwardly outer extending protrusions 771 may be provided in left bracket 721 of mounting bracket 718.

By use of outwardly extending dimple 771, head 775 of screw 773 is disposed substantially or completely out of the way of the path of joist J when U-shaped bracket 718 is slid onto a joist J for attaching mounting assembly 710 on joist J.

Conveniently, one or more through holes 777 may be provided in right mounting bracket 722. In that manner, when box 714 is to be attached to mounting bracket 718 prior to use, the installer may insert a screwdriver through through hole 777 and turn screw head 775 for securing screw 773 into the desired one of thickness varying holes 751, 753 and 755.

Dimple 771 may be elongated, as shown, to resist rotation of box 714 relative to bracket 718. Such elongation of dimple 771 and cavity 761 may likewise assist in the alignment of screw 773 with the desired one of holes 751, 753, and 755 when varying the thickness gauge; i.e., when moving bracket 718 relative to box 714.

Cavity 761 may be considered a slide cavity.

If desired, labels, such as embossed numbers "½", "⅝", and "1" may be provide adjacent respective ones of hole 751, 753 and 755. It is expected that a user will readily appreciate which hole, or pair of holes to use to obtain the desired offset of free edge of 746 from mounting base 720 to accommodate different thicknesses of drywall.

The other features of mounting assembly 710 will be readily appreciated from considering the above described embodiments.

Operation

In use, the electrical fixture mounting assembly 10 according to the embodiment of FIGS. 1–4 will be mounted to stud S as shown in FIG. 4. The user will typically hold electrical fixture mounting assembly 10, such as by grasping junction box 12, and moving assembly 10 in the direction of arrow A, as shown in FIG. 1.

The user will typically have substantially aligned outwardly extending flanges 33, 34 with the lower free edges of support S, as viewed in FIG. 4.

In that manner, outwardly extending flanges 33, 34 will assist the user in guiding electrical fixture mounting assembly 10 into engagement with support S. In the case where support S has a width less than offset 52, as shown in FIG. 3, additional force may have to be exerted by the user in order to spread first and second mounting brackets 21, 22 away from each other. The force exerted by first and second mounting brackets 21, 22 on a support S (owing to first and second mounting brackets 21, 22 exerting a force to return to the initial, unspread apart distance 52) will be selected sufficiently strong so as to retain mounting assembly 10 temporarily in place on support S. The temporary engagement on support S should be sufficiently strong so the user can permanently secure first and second mounting brackets 21, 22 to support S by use of fasteners F (as shown in FIG. 4).

The operation of the preferred embodiment of the electrical fixture mounting assembly 110 of FIGS. 5–7 will be readily apparent from the above description, and from recognizing that the spacing between first mounting bracket 121 and second mounting bracket 122 allows for electrical fixture mounting assembly 110 to be attached to a wide variety of support widths. In addition, the user can fine tune the orientation of first and second mounting brackets 121, 122 by loosening and retightening fasteners 126. Blowouts 132 assist in holding electrical fixture mounting assembly 110 temporarily in position on support S while the user is permanently fastening first and second mounting brackets 121, 122 by use of fasteners inserted through holes 130. The electrical fixture mounting assembly 210 according to the preferred embodiment of FIG. 8, is used in a manner similar to the preferred embodiment of FIGS. 5–7. It will be appreciated that means for securing or adhering electrical fixture mounting assembly 10 to a support includes one or more pieces of tape 251, 252. The user simply provides the adhesive, or exposes the adhesive surface of pieces of tape 251, 252, presses first and second mounting brackets 221, 222 and, hence, respective pieces of tape 251, 252 adhered thereto, against the support at the desired location. Fasteners F, one of which is shown in FIG. 8, can then be used to permanently secure electrical fixture mounting assembly 210 to support S by use of holes 230.

The still further preferred embodiment of electrical fixture mounting assembly 310 according to my invention shown in FIG. 9, is used as follows. The user removes optional release paper 362, exposes adhesive on the face of tape 360, and presses tape 360 at the desired location onto support S. Fasteners can be inserted through mounting holes 365 into support S, as required. As in the other preferred embodiments, such fasteners will carry the weight of supported fixtures, so that junction box 312 remains unloaded.

The embodiment of fixture mounting assembly 410 of FIG. 10 is mounted when the user removes optional release paper 462, as in the embodiment of FIG. 9. Then, a fastener is inserted through mounting hole 465 and/or mounting holes provided in first and second mounting brackets 421, 422, such as in the embodiment of FIG. 5.

The operation of the preferred embodiment of mounting assembly 510 of FIGS. 11–18 will be readily appreciated.

The installer moves mounting assembly 510 in a direction towards joist J until joist J has abutted connecting element or middle portion 520, in the case where have inch drywall is to be installed. Please see FIGS. 12A, 15A, and FIG. 16.

Figure 17:
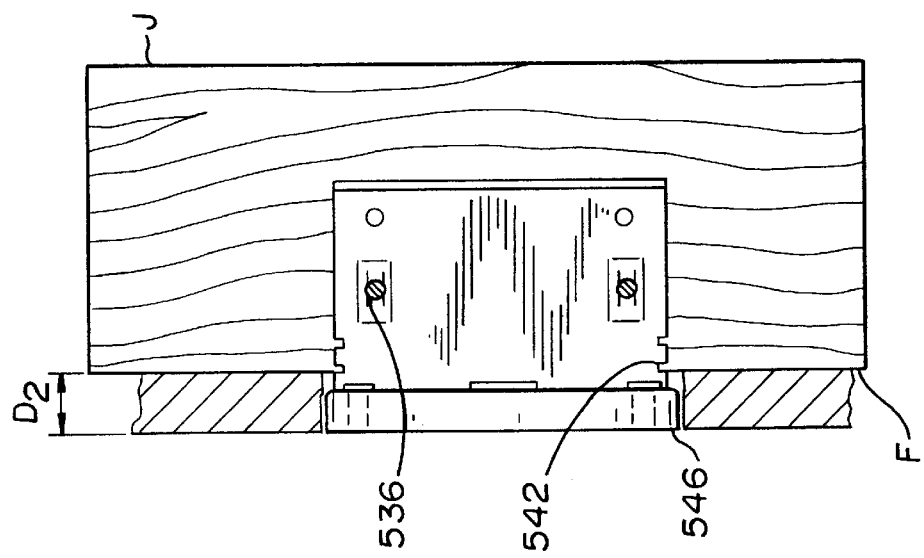
FIG. 17 is a side view similar to FIG. 16 of the mounting assembly of FIG. 11 installed in place with detachably attached permanent fasteners and ⅝ inch fire wall.
Figure 16:
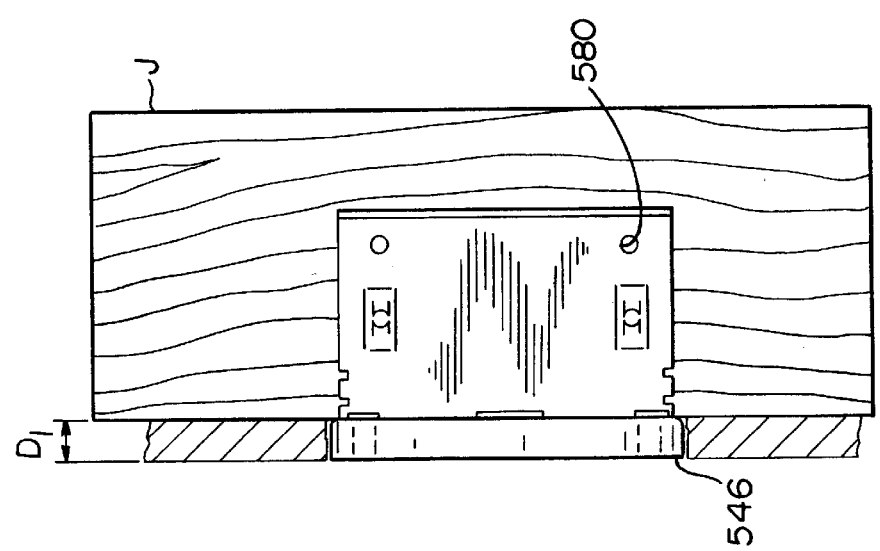
FIG. 16 is a side elevational view of the mounting assembly of FIG. 11 shown installed with a piece of half inch fire wall in place with the use of permanent fasteners.

In the case where ⅝-inch drywall is to be used, the installer will not insert mounting assembly so far that joist J abuts connecting element 520. Rather, joist J will be spaced apart from mounting element 520 as shown in FIG. 17. That is, the user will look at guide elements or indicators 542 and align the outer free end F of joist J therewith. In that manner, the distance between free edge 546 and free face F of joist J of ⅝-inch will be achieved.

Figure 15A:
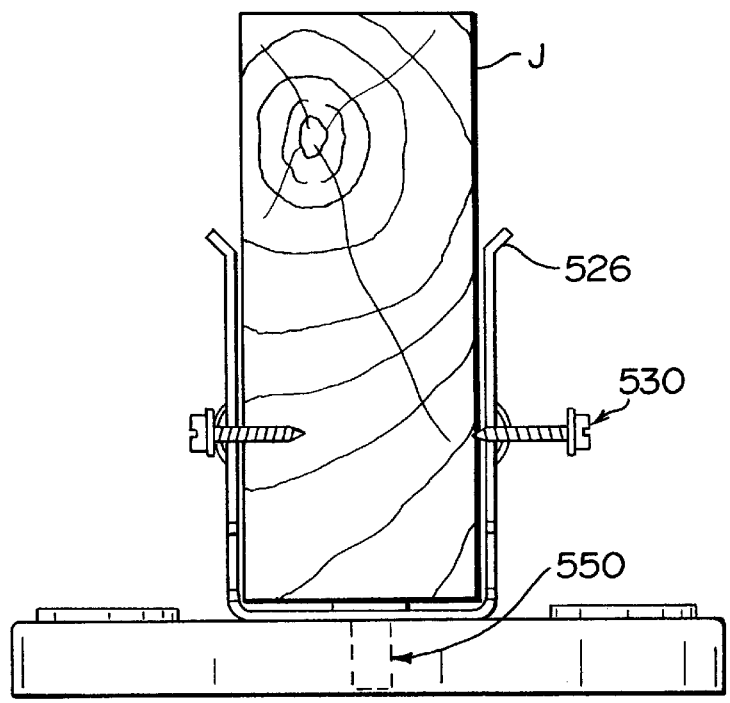
FIG. 15A is a further side elevational view similar to FIG. 12, showing the mounting assembly of FIG. 11 in use installed on a joist.
Figure 15B:
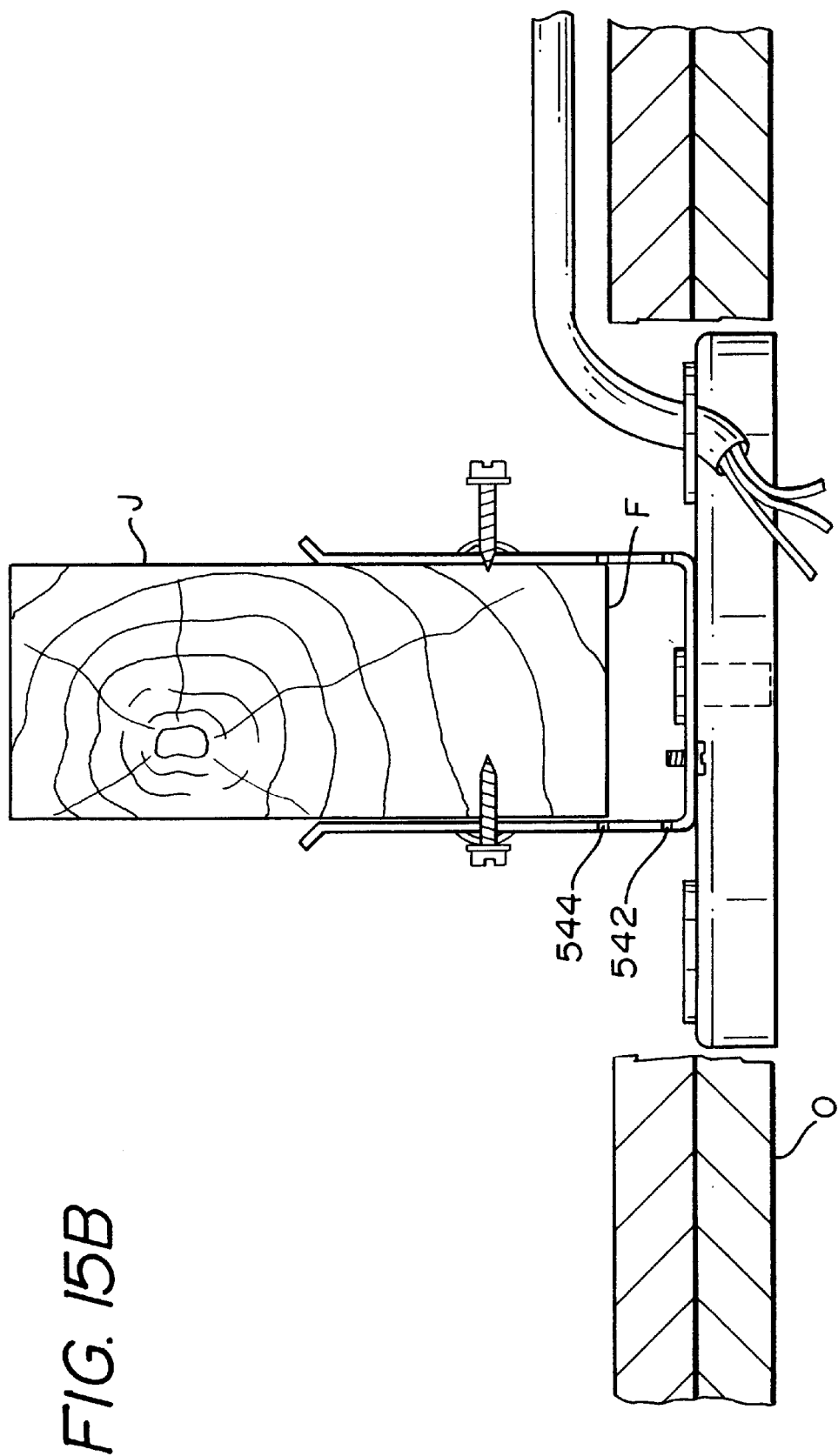
FIG. 15B is a view similar to FIG. 15A, showing the mounting assembly installed with a different thickness of drywall.
Figure 18:
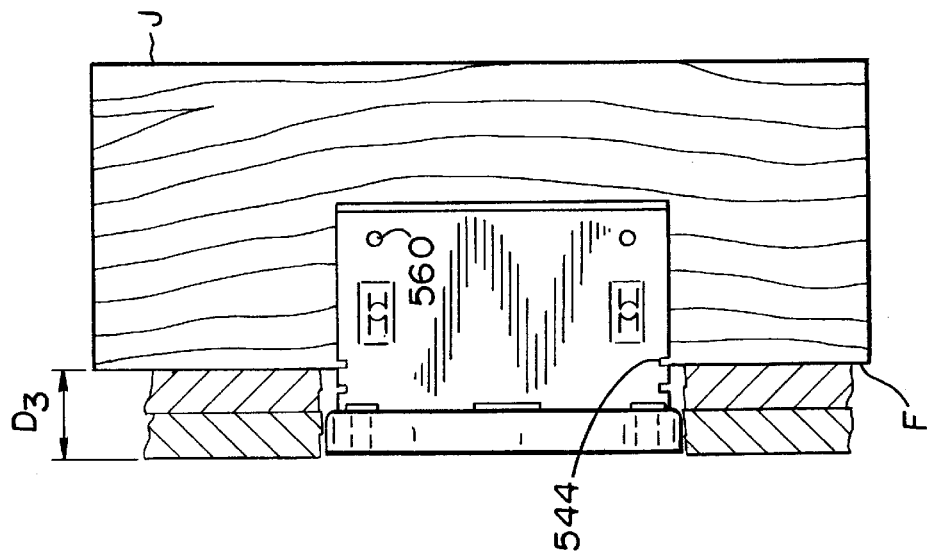
FIG. 18 is a view similar to FIG. 16 prior to the use of permanent fasteners, and with a one inch fire wall installed.

In the case where a 1-inch fire wall is to be used, the installer will insert free end F only up to thickness indicators 544, as best seen in FIGS. 15B and 18.

When the desired location of joist J relative to free edge 546 of junction box 514 has been achieved, the installer will secure mounting assembly 510 to joist J. As will be appreciated from the description above, the installer secures mounting assembly 510 to joist J by one or both of screws 536 and nails 580. The installer then secures the electrical fixture to be mounted to mounting assembly 510 by use of the male fasteners typically provided with the fixture and secure such male fasteners with the female threads 546 of studs 550. The box may be wired in a conventional manner.

The embodiment of FIGS. 19 and 20 will be used in a manner similar to the embodiment of FIG. 11. However, the FIG. 19 embodiment has junction box 614 of a desired height or depth or thickness so that only one thickness of drywall is expected to be used therewith. Specifically, it is expected that only a 1-inch thick wall will be used with mounting assembly 610, such as by attaching two ½-inch sheet of drywall together, as illustrated. Thus, the user simply slides and/or pushes mounting assembly 610 completely onto joist J until connecting member 620 abuts joist J. The user then secures mounting assembly 610 by screwing screws 536 and/or nailing nails 580 through holes 560 into joist J.

In order to use the embodiments of FIGS. 21 and 22, the user first decides on which side of a joist J box 714 should be located. If box 714 is to be located on the left of joist J, as shown in FIG. 21, then the user secures screws 773 into the desired ones of holes 751, 753, and 755. The user must, of course, first determine whether ½-inch, ⅝-inch, or 1-inch drywall is to used. If ⅝-inch drywall is to be used as the finishing wall then the user will secure the top one of screw 773 into the top one of hole 753, as illustrated, and the bottom illustrated screw 773 into the bottom hole 753, respectively. Thus, holes 751, 753 and 755 in the wall of box 714 may be considered a plurality of holes included as a thickness gauge.

It is contemplated that the various features of each of the different embodiments of FIGS. 1–22 will be used on other ones of the embodiments of FIGS. 1–22. For example, double-sided tape or other adhesives may be applied to any of the embodiments on any of the various surfaces, dependent on the particular application in which the embodiments are to be put to use.

The height of mounting bracket 518 may be 1, 2, 3, 4, 5, or more times as high as the height or thickness of box 514 for added strength and stability of the connection to joist J, in use. This is true for all embodiments.

Note, for example, that the distance from mounting portion 520 to flared guide 526 is about five (5) times as long as the height of box 514; i.e., about five (5) times the distance from free edge or outer face 546 to top wall 516. Thus, for a 1-inch tall box 514, mounting bracket 518 may be five (5) inches high or more for improved support, strength, and stability.

It is expected that the electrical fixture mounting assembly according to my invention will be made of various plastics, composite materials, stamped sheet metal, and the like, depending on the intended use. My invention has been successfully used on wooden studs, sheet metal studs, and other supports and mounting surfaces.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:
1. A mounting assembly, comprising:
   a) a junction box;
   b) the junction box including a wall defining a junction box cavity therein;
   c) a mounting bracket disposed on the wall for engaging a joist;
   d) a pre-attached fastener provided on the mounting bracket for attaching the bracket to a joist; and,
   e) the pre-attached fastener is a screw which may be detachably attached to a joist, so that the mounting bracket may be detachably attached to a joist.
2. A mounting assembly, comprising:
   a) a junction box;
   b) the junction box including a wall defining a junction box cavity therein;
   c) a mounting bracket disposed on the wall for engaging a joist;
   d) a pre-attached fastener provided on the mounting bracket for attaching the bracket to a joist; and,
   e) means is provided on the mounting bracket for supporting a fixture, the fixture supporting means transferring forces exerted on said fixture supporting means substantially without exerting such forces on the junction box.
3. A mounting assembly, comprising:
   a) a junction box;
   b) the junction box including a wall defining a junction box cavity therein;
   c) a mounting bracket disposed on the wall for engaging a joist;
   d) a pre-attached fastener provided on the mounting bracket for attaching the bracket to a joist; and
   e) a stud provided on the mounting bracket for supporting a fixture, the stud transferring forces exerted on said stud substantially without exerting such forces on the junction box.
4. A mounting assembly as defined in claim 3, wherein:
   a) the stud includes female threads.
5. A mounting assembly, comprising:
   a) a junction box;
   b) the junction box including a wall defining a junction box cavity therein;
   c) a mounting bracket disposed on the wall for engaging a joist;
   d) a pre-attached fastener provided on the mounting bracket for attaching the bracket to a joist; and,
   e) a thickness gauge is provided on the mounting bracket.
6. A mounting assembly as defined in claim 5, wherein:
   a) a fixture fastener is attached to the mounting bracket for supporting a fixture adjacent to the junction box.
7. A mounting assembly, comprising:
   a) a junction box;
   b) the junction box including a wall defining a junction box cavity therein;
   c) a mounting bracket disposed on the wall for engaging a joist; and
   d) a thickness gauge provided on the mounting bracket.
8. A mounting assembly as defined in claim 7, wherein:
   a) the thickness gauge includes a notch in the bracket.
9. A mounting assembly as in claim 7, wherein:
   a) a pre-attached fastener is provided on the mounting bracket for attaching the bracket to a joist.
10. A mounting assembly as defined in claim 7, wherein:
    a) said wall includes a top wall and a downwardly extending side wall; and,
    b) said mounting bracket is disposed on said top wall.
11. A mounting assembly as defined in claim 7 wherein:
    a) said wall includes a top wall and a downwardly extending side wall; and,
    b) said mounting bracket is disposed on said side wall.
12. A mounting assembly as defined in claim 7, wherein:
    a) the thickness gauge includes a plurality of holes in the wall of the junction box; and
    b) a fastener is provided on the mounting bracket for attaching the bracket to the box.
13. A mounting assembly as defined in claim 12, wherein:
    a) the mounting bracket is detachably attached to the junction box; and
    b) the fastener attaches the mounting bracket to a selected one of the plurality of holes for varying the distance between the mounting bracket and an outer face of the junction box.
14. A mounting assembly as defined in claim 12, wherein:
    a) the junction box has an outer face;
    b) a first one of the plurality of holes is spaced at a first distance from the outer face of the junction box; and
    c) a second one of the plurality of holes is spaced at a second distance from the outer face of the junction box.
15. A mounting assembly as defined in claim 14, wherein:
    a) the mounting bracket is detachably attached to the junction box; and
    b) the fastener attaches the mounting bracket to a selected one of the plurality of holes, for varying the distance between the mounting bracket and the outer face of the junction box.
16. A mounting assembly, comprising:
    a) a junction box;
    b) the junction box including a wall defining a junction box cavity therein;

c) a mounting bracket disposed on the wall for engaging a joist;
d) a pre-attached fastener provided on the mounting bracket for attaching the bracket to a joist; and,
e) a fixture fastener is attached to the mounting bracket for supporting a fixture adjacent to the junction box.

17. A mounting assembly as defined in claim 16, wherein:
a) the bracket is configured for attaching the junction box to opposite sides of a joist.

18. A mounting assembly as defined in claim 16, wherein:
a) the mounting bracket is a U-shaped bracket.

19. A mounting assembly as defined in claim 16, wherein:
a) the mounting bracket includes a first mounting bracket spaced apart from a second mounting bracket.

20. A mounting assembly as defined in claim 18, wherein:
a) the mounting bracket has an outer free edge, and the outer free edge is flared.

21. A mounting assembly as defined in claim 16, wherein:
a) the pre-attached fastener is a screw which may be detachably attached to a joist, so that the mounting bracket may be detachably attached to a joist.

22. A mounting assembly as defined in claim 16, wherein:
a) an adhesive is provided on the junction box.

23. A mounting assembly as defined in claim 22, wherein:
a) the adhesive includes double-sided tape.

24. A mounting assembly as defined in claim 16, wherein:
a) means is provided on the mounting bracket for supporting a fixture, the fixture supporting means transferring forces exerted on said fixture supporting means substantially without exerting such forces on the junction box.

25. A mounting assembly as defined in claim 24, wherein:
a) said fixture supporting means includes a stud.

26. A mounting assembly as defined in claim 16, wherein:
a) the fixture fastener is configured for transferring forces from a fixture to the mounting bracket substantially without transferring forces to the box.

27. A mounting assembly as defined in claim 26, wherein:
a) the fastener includes a stud with internal female threads.

28. A mounting assembly as defined in claim 16, wherein:
a) a thickness gauge is provided on the mounting bracket.

29. A mounting assembly as defined in claim 28, wherein:
a) the thickness gauge includes a notch in the bracket.

\* \* \* \* \*